United States Patent [19]

Pall

[11] Patent Number: 4,521,309
[45] Date of Patent: Jun. 4, 1985

[54] FILTER CARTRIDGE WITH CASTELLATED SUPPORT AND PROCESS OF MAKING THE SAME

[75] Inventor: David B. Pall, Roslyn Estates, N.Y.

[73] Assignee: Pall Corporation, Glen Cove, N.Y.

[21] Appl. No.: 590,115

[22] Filed: Mar. 16, 1984

Related U.S. Application Data

[63] Continuation of Ser. No. 448,534, Dec. 10, 1982, abandoned, which is a continuation of Ser. No. 335,316, Dec. 29, 1981, abandoned, which is a continuation of Ser. No. 167,979, Jul. 14, 1980, abandoned.

[51] Int. Cl.³ .............................................. B01D 27/06
[52] U.S. Cl. ................................ 210/493.2; 264/162; 264/257; 264/275
[58] Field of Search ................ 55/501, 502, 510, 515, 55/521, 522, 524; 210/483, 484, 485, 493.1, 493.2, 496, 497.01, 497.2, 498; 264/162, 257, 275, 327

[56] References Cited

U.S. PATENT DOCUMENTS 3,457,339 7/1969 Pall et al. ............................ 264/257
4,104,170 8/1978 Nedza ............................... 210/493.2

*Primary Examiner*—Ivars Cintins

[57] ABSTRACT

A filter cartridge is provided comprising, in combination:
(1) a filter sheet material formed in a tube open at at least one end;
(2) a support such as an internal core or external sheath disposed in supporting relation to and substantially coextensive with the tube and supporting the filter sheet material of the tube;
(3) the support having one end at the open end of the tube formed in a castellated configuration in which at least some of the castellations define grooves therebetween, preferably having reentrant sides; and
(4) at least one end cap attached to and extending across the open end of the tube of filter sheet material, and having embedded therein at least the castellated end of the support, with end cap material extending into and substantially filling the grooves, thereby fixedly attaching the end cap to the support in a leak-tight seal.

25 Claims, 5 Drawing Figures

FILTER CARTRIDGE WITH CASTELLATED SUPPORT AND PROCESS OF MAKING THE SAME

This is a continuation of application Ser. No. 448,534, filed Dec. 10, 1982, which in turn is a continuation of Ser. No. 335,316, filed Dec. 29, 1981, which in turn is a continuation of Ser. No. 167,979, filed July 14, 1980, all three now abandoned.

Filter cartridges are made up of a tubular filter element whose open ends are closed off by end caps and which is supported on an internal core. The tubular filter element is of filter sheet material, which may or may not be corrugated.

Tubular filter elements can be arranged to accept fluid flow from the outside surface of the filter through the filter to the inside, or from the inside surface of the filter through the filter to the outside. If flow is from outside to inside the filter, the filter element requires support by an internal core to enhance the resistance of the filter sheet material to rupture under high pressure differentials thereacross. If the flow is from inside to outside of the filter, then the filter sheet requires support from an external sheath. To avoid problems arising from backflow in either case, both internal and external supports can be provided.

In the manufacture of tubular filter elements from one or more sheets of filter material, it is customary to fold the sheet or sheets into the form of a tube or cylinder, possibly corrugating the sheet or sheets beforehand to increase the surface area of the filter within a limited volume, and then lap the opposite ends of the sheet material in a side seam and bond the ends of the sheet together by an interposed adhesive layer. One or both of the open ends of the tube are then closed by application of end caps, which are bonded to the tube end and the internal core or external sheath, or both, if both be present. The caps are usually provided with internal and external peripheral flanges which embrace the outer surface of the end of the tube, as well as the interior of an internal core, if present, or the exterior of an external sheath, if present, retaining these within the flanges, and also aiding in ensuring a secure leak-tight seal. The end caps are provided with apertures, as required for fluid flow to or from the interior of the filter tube in fitting the filter element in the filter assembly. The end caps may be open at one or at both ends, as required by the filter assembly, being closed at one end in a T-type assembly, and open at each end in an in-line assembly. The end caps may also have portions adapted to receive and seal against a gasket or other sealing means, to ensure a tight fit with the line connection in a fluid system.

The bonding of end caps to the filter sheet material and any internal core or external sheath that may be present has always posed a difficult problem, because it is not easy to obtain a leak-tight seal throughout the bonding area. It is absolutely essential that the seal between the end caps and the filter be leak-tight, since otherwise unfiltered fluid can bypass the filter at this point, contaminating the cleaned filtrate. It is also essential in some types of assembly that there be a secure bond fixing the core and/or sheath in position against rotation with respect to the filter element and the end caps, so that torque can be applied to the end cap to turn the cartridge. Without disruption of any leak-tight seal between the filter element and end cap, and also to prevent structural damage to the filter, because the filter sheet material is structurally weak. If it is necessary to rotate or adjust the position of the filter cartridge in the filter assembly, any mechanical torque has to be applied to one end cap, which means that torque has to be transmitted through a rigid structural component (such as the core or sheath;) to the other end cap, since the filter element itself is quite unable to accept any such torque.

End caps can be attached to the open ends of a filter tube and core and/or sheath by way of adhesive, but it is virtually impossible to insure the obtention of a seal that is leak-tight throughout by use of an adhesive. Moreover, an adhesive is mechanically too weak to fix the end caps to a core and/or sheath in a bond that will resist shifting or detachment upon application of torque to the end caps.

One way to avoid this is to embed the filter tube and core and/or sheath in the end cap material. This can be done in any of several ways.

It is possible to form end caps in situ on the ends of a filter cartridge, by casting them or potting them over an immersed end of the filter tube with the aid of a mold form. A thermoplastic or thermosetting resin such as a plastisol is poured into a mold of the desired end cap design. One end of the tubular filter and then the other end are dipped in turn into the resin, and then the resin is allowed to harden or cured in situ to form a hardened end cap. Such a procedure for end-capping is disclosed in U.S. Pat. No. 2,732,031 dated Jan. 24, 1956 to Rabbit et al; U.S. Pat. Nos. 2,771,156 and 2,934,791 to Kasten et al, dated Nov. 20, 1956, and May 3, 1960 respectively; and U.S. Pat. No. 2,941,620 to Thornberg, dated June 21, 1960.

However, end caps prepared by casting normally do not conform to the necessary close tolerances and sharp definition of contour details that are readily obtained in end caps formed by injection molding. Moreover, liquid thermoplastic and thermosetting resins are unsuitable where the end caps are to be formed on tubular filters containing ultrafine filter material. The viscosity of the liquid resins commercially used for this purpose is high so that they cannot completely penetrate the pores of the filter medium to form a leak-tight seal with the filter material. If the resin has a viscosity that is sufficiently low to enable it to penetrate the pores, then an excess amount of wicking results, with the result that the liquid resin can enter a large portion of the length of the filter element, resulting in reduction of the filtering capacity of the filter material, and also poor bonding, as such resin is drawn away from the joint between the end cap and the end of the filter sheet material.

U.S. Pat. No. 3,013,667, dated Jan. 19, 1961, to Jackson et al describes a method of end-capping tubular filter elements wherein the thermoplastic end caps or capped discs are subjected to the heat developed in an induction field of an electric induction coil in contact with the cap, to a point where the cap is so softened that the edges of the filter element can be embedded in the cap to the depth required to permanently bond the parts together. A metallic strip is applied to the edges of the filter element and the external support jacket, or the edges of the filter element and the external support jacket are coated with an electrically conductive or semi-conductive material, so as to reinforce the filter edges and enhance the heat conductivity through the edges and the end cap.

In order to avoid losing the shape of the end caps, Jackson et al can only soften the portion of the end cap where the filter material is embedded into the cap. This procedure does not produce a truly strong leak-tight seal, because the temperature reached by the metallic edges is limited to below from about 350° to 400° F. In localized heating of the end cap at such low temperature, the softened thermoplastic resin of the end cap is too viscous to wet and penetrate the pores of the filter material, with the result that the bonding is inadequate, and a faulty seal results.

In addition, the Jackson et al filter element is designed so that the edges of the filter element and the internal core are not flush, and thus the core does not join with the filter edges in making a flush fit against the end cap, to ensure a leak-tight seal.

U.S. Pat. No. 3,457,339 to Pall et al, dated July 22, 1969, provides a process for applying end caps to tubular filter elements with or without an internal core and/or external sheath by liquefying an inside face of a thermoplastic end cap to from about 10 to about 90% of the thickness of the end cap to be adhered to the filter tube, while cooling the outside face of the end cap to a temperature below its softening point to maintain the remainder of the end cap in a solid state; embedding all of the edges of one end of the filter material as well as the ends of any core or sheath in the liquefied face of the end cap in a leak-tight seal therewith; allowing the liquefied thermoplastic material to permeate the pores of the filter material; and hardening the liquid plastic, thereby bonding the end cap to the filter sheet and core or sheath. This procedure can be repeated for capping the other end of the filter element, and thus completing the filter cartridge.

While embedding the filter support and filter sheet material in the end cap may ensure a leak-tight and secure seal between the end cap and the filter sheet material, it does not provide sufficient mechanical strength to resist internal damage to the structure when the resulting filter cartridge is subjected to high mechanical torque. The result is the appearance of an internal radial crack at the end cap, which sometimes appears after the filter cartridge has been subjected to steam sterilization or after drying. The problem may in part arise from an inadequate bond between the support and the end cap, which leads to failure to transmit torque through an assembled filter cartridge.

In accordance with the invention, it has now been determined that this difficulty can be overcome by castellating the end of the filter core and/or sheath that is embedded in the end cap. The castellations become filled with resin during casting, potting, softening or melt-bonding of the end cap to the core and/or sheath, with the result that the end cap is sufficiently well fixed to the core or sheath to enable transmission of a mechanical torque from one end cap through an assembled filter cartridge to the other end cap. A sufficient grip is developed in this way to prevent separation of the core and/or sheath from the end cap during the drying operation, and during autoclaving.

Accordingly, the invention provides a filter cartridge that comprises, in combination:

(1) a filter sheet material formed in a tube open at at least one end;
(2) a support such as an internal core or external sheath disposed in supporting relation to and substantially coextensive with the tube and supporting the filter sheet material of the tube;
(3) the support having one end at the open end of the tube formed in a castellated configuration in which at least some of the castellations define grooves therebetween, preferably having reentrant sides; and
(4) at least one end cap attached to and extending across the open end of the tube of filter sheet material, and having embedded therein at least the castellated end of the support, with end cap material extending into and substantially filling the grooves, thereby fixedly attaching the end cap to the support in a leak-tight seal.

The invention also provides a process for applying end caps to filter sheet material formed in a tube open at at least one end, and supported by a support that is substantially coextensive with the tube, such as a core or a sheath, which comprises:

(1) forming at least one end of the support in a castellated configuration in which at least some of the castellations define grooves therebetween preferably having reentrant sides;
(2) embedding the castellations of the support into one face of the end cap material, with end cap material extending into and substantially filling the grooves; and
(3) hardening the end cap material, thereby fixedly attaching the end cap to the support in a leak-tight seal.

The preferred process of the invention for applying end caps to tubular filter sheet material and any internal and/or external support therefor comprises liquefying an inside face of a thermoplastic end cap to from about 10 to about 90% of the thickness of the end cap to be adhered to the filter tube and support, while cooling the outside face of the thermoplastic end cap to a temperature below its softening point to maintain the remainder of the end cap in a solid state; at least one end of the support being formed in a castellated configuration in which at least some of the castellation define grooves therebetween; embedding all of the edges of one end of the tube of filter material and the castellated end of the tube support in the liquefied face of the end cap in a leak-tight seal therewith; allowing the liquefied thermoplastic material to substantially fill the grooves of the castellated end of the support and to permeate the pores of the filter material; and hardening the liquid plastic in the grooves and pores, thereby bonding the end cap to the filter tube and to the support in a leak-tight seal.

This process is described in U.S. Pat. No. 3,457,339 to Pall et al, dated July 22, 1969, the disclosure of which is hereby incorporated by reference. However any of the processes described in the patents referred to above can also be used.

Thus, the end caps can be formed in situ on the ends of a filter cartridge, by casting them or potting them over an immersed end of the filter tube with the aid of a mold form. A thermoplastic or thermosetting resin such as a plastisol is poured into a mold of the desired end cap design. One end of the tubular filter and then the other end are dipped in turn into the resin, and then the resin is allowed to harden or cured in situ to form a hardened end cap. This procedure for end-capping is disclosed in U.S. Pat. No. 2,732,031 dated Jan. 24, 1956 to Rabbit et al; U.S. Pat. Nos. 2,771,156 and 2,934,791 to Kasten et al, dated Nov. 20, 1956, and May 3, 1960 respectively; and U.S. Pat. No. 2,941,620 to Thornberg, dated June 21, 1960, the disclosures of which are hereby incorporated by reference.

It is also possible to utilize the method of end-capping tubular filter elements described in U.S. Pat. No. 3,013,607, dated Jan. 19, 1961, to Jackson et al, the disclosure of which is hereby incorporated by reference, wherein the thermoplastic end caps or capped discs are subjected to the heat developed in an induction field of an electric induction coil in contact with the cap, to a point where the cap is so softened that the edges of the filter element can be embedded in the cap to the depth required to permanently bond the parts together. A metallic strip is applied to the edges of the filter element and the external support jacket, or the edges of the filter element and the external support jacket are coated with an electrically conductive or semi-conductive material, so as to reinforce the filter edges and enhance the heat conductivity through the edges and the end cap.

The procedure can be repeated for end-capping the other end of the filter element.

When using a preformed end cap, in softening or melt-bonding, the process of the invention can be advantageously modified, and preferably is, to further ensure the formation of a leak-tight seal between the filter element, the end cap and the support, by first grinding the ends of the filter tube and the internal and/or external support until their edges are substantially of the same length and flush, so that a flush fit of the end edges of the filter tube material, core and/or external support can be effected against the end cap.

In implementing this embodiment, the apparatus employed can be that described in U.S. Pat. No. 3,457,339, but it is preferably so arranged as to be capable of developing a uniform melt depth over the entire end cap surface. In addition, during the step of attaching the end cap to the filter tube and support ends, the internal and external peripheral sides of the assembly are restrained by abutting copper surfaces, which prevent the resin from extruding during the impregnation of the end of the assembly, and make it possible to substantially completely fill the castellations.

The apparatus for carrying out this embodiment of the process in accordance with the invention comprises an end cap holder; means to liquefy an exposed face portion of an end cap in the holder; and means to cool a remaining unexposed face portion of the end cap to sufficiently below its liquefaction temperature to maintain it in a solid condition while the exposed face is liquid.

In a preferred embodiment of the apparatus, the end cap holder is equipped with means to cool the end cap.

In carrying out the process of the invention, using the above described apparatus, a thermoplastic filter end cap is inserted into the end cap holder, which is designed so that a close fit is maintained between the end cap and holder. The end cap holder is cooled, for example by water cooling, so that the unexposed face of the end cap in contact with the holder is cooled and thereby at all times is maintained at a temperature below its melting point and in a solid state.

The end cap is heated, for example, by a direct flame generated by a burner, preferably shaped to the contour of the end cap, to a temperature above the maximum softening point of the thermoplastic material, thereby liquefying the exposed top face of the end cap to from about 10 to about 90% and preferably from about 40 to about 60% of its thickness. The flame is then removed from the end cap, and one end of a filter element and contiguous internal support or core and/or external support or sheath whose edges are substantially even with any external and/or internal support, is then placed into the molten end cap to the desired depth, which could be up to 90% of the thickness of the end cap and preferably is no more than about 60% of the thickness of the cap. The relatively cold filter element causes the end cap material to harden in a few seconds, and wicking is thereby prevented. The filter element and end cap are allowed to remain in the end cap holder until the end cap has completely solidified, at which time a unitary structure comprised of the filter element support and end cap is formed, which can then be removed from the holder.

The means to liquefy a portion of the thickness of the end cap includes any conventional heat source which can raise the temperature of the thermoplastic material above its maximum softening point, such as a burner to produce an air or oxygen flame, hot air at a temperature well above the liquefaction point of the thermoplastic material, radiant heat, and the like. The heat source need be directed against the end cap only for that amount of time necessary to heat one face of the end cap to a temperature above its maximum softening temperature, thereby to liquefy the end cap to the desired depth. Thus, for example, where a polypropylene end cap is employed, a flame, depending upon its temperature, need be directed against the face of the end cap for from about 20 to about 60 seconds.

The process and apparatus of the invention are applicable to end capping tubular filter elements of any configuration. An end cap appropriate to the configuration of the tubular filter element is of course employed in each case. Normally, filter elements in cylindrical corrugated form are employed, but it will be apparent that the process is applicable to tubular elements in any cross-sectional configuration, including plain, folded, convoluted and corrugated triangular, square, rectangular, elliptical, and indeed any polygonal filter tubes. The size and configuration of the convolutions in the case of a corrugated element are absolutely immaterial, and so also is the thermoplastic material of which the filter element and end caps are made.

The process is applicable to tubular filter elements made of any filter material. If the material has insufficient rigidity to be self-supporting, the tube can be made so by incorporation of a central core or support, such as a spring or tube of rigid metallic or plastic material, for instance, a perforated metal core or spring of conventional construction. As indicated it will usually be desirable in such a case to have the internal support of a length substantially equal to that of the filter element so that the internal support and the edges of the filter element are in a substantially flush fit with the end cap when they are bonded thereto. The end caps can be furnished with appropriate raised or depressed portions to meet the shape requirements of the ends of the filter support and the folds or convolutions of the filter tube, and in accordance with the requirements of the filter assembly in which the filter element is to be used.

Thus, the process of the invention is applicable to filter elements made of any porous sheet material having pores extending from surface to surface. One or several layers of the same or varying porosity can be employed, in close juxtaposition, or even bonded together, or also spaced apart. Paper, which can, if desired, be resin-impregnated, is a preferred base material, since it yields an effective, versatile and inexpensive fluid-permeable filter medium. The invention is, however, applicable to papers and like sheet materials formed of any type of fiber, including not only cellulose fibers but also synthetic resin fibers, and fibers of other cellulose derivatives, including, for example, fibers of polyvinyl chloride, polyethylene, polypropylene, polyvinylidene chloride, cellulose acetate, cellulose acetate propionate, viscose rayon, polyacrylonitrile, polymers of terephthalic acid and ethylene glycol, polyamides, and protein fibers of various sorts, such as zein and the alginates, glass, asbestos, potassium titanate, mineral wool, polystyrene, rubber, casein, hemp, jute, linen, cotton, silk, wool, and mohair. Also useful, in addition to papers, are textile fabrics, and woven and nonwoven fibrous layers of all kinds, such as felts, mats and bats made of fibrous materials of any of the types listed above.

The invention is of particular application to resin filter membranes, such as polyamide, polyester, polyimide, cellulose acetate, polyethylene, polypropylene, and synthetic rubber membranes.

The filter sheet material of which the filter elements of the invention are made, if desired, can be impregnated with a synthetic resin or cellulose derivative to increase its strength and resistance to wear by the fluid being filtered. The impregnating agent can be any material useful in the impregnation of papers and textile materials. Such materials are well-known in the paper and textile arts. The impregnating agents can be in liquid form, capable of undergoing solidification as by polymerization, cross-linking, or the like. They can also be in solid form, and applied to the base from a solution in an inert solvent, or as melts. Representative impregnating resins include phenol-formaldehyde resins, urea-formaldehyde resins, melamine-formaldehyde resins, polyester resins, and polyepoxide resins.

The process of the invention is particularly applicable to microporous filter elements. Microporous filter elements may be defined as having an average pore size of less than about 5 microns and preferably an average pore size of less than about 0.5 micron. There is no effective lower limit on the pore size of the microporous filter, except that imposed by the excessive pressure required to force water to pass through the filter, an unduly low rate of flowthrough, and more rapid plugging. It has been found, in practical applications, that microporous filters having an average pore size as low as 0.02 micron and even lower can be end capped in the invention.

Microporous resin membranes such as polyamide membranes are preferred.

The depth or thickness of the microporous filter is not critical. A thick filter operates efficiently, but it should not create an undue pressure drop.

A preferred microporous filter is made of a porous base, such as paper, having relatively large pores, within or on the surface of which is deposited particulate material in an amount to diminish the average diameter thereof to less than 1 micron while retaining a voids volume in the microporous portion in excess of 75%, as disclosed in copending U.S. application Ser. No. 98,595 filed Mar. 27, 1961, now U.S. Pat. No. 3,238,056 to Pall et al dated Mar. 1, 1966, U.S. Ser. No. 215,151 filed Aug. 6, 1962, now U.S. Pat. No. 3,246,767 to Pall et al dated Apr. 19, 1966 the disclosures of which are herein incorporated by reference. The particulate material, which can be in the form, for example, of fibers or fine structured granules, is suspended in a fluid and deposited therefrom upon the surface of the porous base material. The particulate material can all be of the same size and type, or of two or more sizes and types, all suspended in the fluid system. The desired reduction in pore diameter of the base is obtained by varying the size and amount of the particulate material deposited, blending different sizes at different points, if desired. A particularly preferred microporous filter is one of the type described in U.S. Pat. No. 3,246,767, which comprises a porous base having superimposed thereon and adherent thereto a microporous layer comprising a fibrous material of which a proportion of fibers extend outwardly from the porous base at an angle greater than 30%, the microporous layer having an average pore diameter of less than 1 micron and a voids volume of at least 75%. The fiber spacing and angular disposition to the base throughout the entire microporous layer is noted by cross-sectional examination, upon sufficient magnification through an optical or electron microscope. The angular disposition of the fibers is in a large measure responsible for the high voids volume and low pore size characteristic of these microporous filters.

The end caps can be of any desired configuration, appropriate to the requirements of the filter tube and filter assembly. Usually, at least one of the end caps will be provided with an aperture for delivery of filtered fluid from or unfiltered fluid to the interior of the structure. In many instances, both end caps will be apertured, particularly where a plurality of filter elements are to be connected together to form a long tube.

As is well known in the field of plastics, most thermoplastic materials have a wide range of temperatures over which they can be softened. However, it is only after the thermoplastic material is heated to a temperature above its maximum softening point that the material is liquefied. The end caps that are suitable for use herein can be made by potting or casting in situ, or preformed, from any thermoplastic resin that is in, or can be brought to, sufficiently softened or even a liquid state, as by heating to above its maximum softening point, to permit embedding therein of the filter sheet material and any supports therefor. If an ultrafine filter material, i.e. filter material having an average pore size less than about 5 microns, is employed, the thermoplastic material employed in the end cap preferably when liquid has a low viscosity, and preferably less than about 50 c.p., to ensure that the resin can penetrate the pores of the filter material, and thus form a leakproof seal.

The end cap resin materials can be employed alone, with conventional fillers and/or pigments and/or in solution in a suitable solvent. Typical resins which can be employed herein, their softening range, and their liquefaction temperature, are set out in the Table below. It is to be understood that the liquefaction temperature of the resins listed hereinafter varies with the molecular weight of the resins, and that the softening range listed for each resin is for the most common form of the particular resin.

TABLE

| Name | Softening point | Liquefaction point |
| --- | --- | --- |
| Polyethylene | About 221° F. | Above 110 to 115° C. |
| Polypropylene | 285–320° F. | Above 320° F. |
| Polyisobutylene | | Above 355° F. |
| Polystyrene | 190–230° F. | Above 230° F. |
| Polyamides (nylon) | 450–485° F. | Above 485° F. |
| Cellulose acetate | 115–230° F. | Above 230° F. |
| Ethyl cellulose | 210–270° F. | Above 270° F. |
| Cellulose acetate butyrate | 140–250° F. | Above 250° F. |

TABLE-continued

| Name | Softening point | Liquefaction point |
| --- | --- | --- |
| Copolymers of vinyl chloride and vinyl acetate | 140–150° F. | Above 150° F. |
| Polyvinyl chloride | Varies with plasticizer | |
| Polyvinylidene chloride (Saran) | 100–325° F. | Above 325° F. |
| Vinylidene chloride-copolymer (Saran) | 230–280° F. | Above 280° F. |
| Polyvinylbutyral | 140–158° F. | Above 158° F. |
| Polytrifluorochloro-ethylene (Kel-F.) | 346° to 570° F. depending on molecular weight | Depends on molecular weight |
| Polymethyl methacrylate | 140–230° F. | Above 230° F. |
| Synthetic rubbers such as hard rubber | 150–190° F. | Above 190° F. |

In addition to the above materials, other thermoplastic materials such as lignin-sulfonate resins, terpene resins, and the like can be used herein. The term "thermoplastic" is accordingly used herein to refer both to thermoplastic resins and to such resins in a liquid stage of polymerization, further polymerizable to a solid polymer.

As indicated hereinbefore, the process is applicable to filter elements made of any material and end caps made of any thermoplastic material. However, where the end cap and the filter material are of the same material, the seal formed between the end cap and the edges of the filter is exceptionally strong.

Similarly, if the end caps and the supports, internal and/or external core and/or sheath are of the same material, an internal structure is obtained that is exceptionally resistant to mechanical torque. The filter sheet can also be of the same material, with even better results.

Since no two materials have precisely the same chemical resistance to all media to be filtered, it has been found to be desirable to employ heat-sealed filter materials, internal core supports and end caps which are substantially of the same thermoplastic material under corrosive conditions or where contamination of the filter material, internal support core and/or end cap by the medium being filtered is a problem. Thus, for example, where a corrosive fluid is being filtered, the internal support or core filter material and end cap can be made entirely from thermoplastic resins, such as polyethylene or polypropylene or polyamide, or any of the other thermoplastic materials set forth hereinbefore, and the filter material heat-sealed. A filter element made entirely of one material is resistant to attack to a wide range of reagents, hence is more widely useful than a filter element wherein a second component has been introduced, thereby limiting its range of application.

The support for the filter tube can be any of the thermoplastic materials referred to above for the end cap, and preferably is of the same material. It must in any case be melt-compatible with the end cap material.

The castellated end portions can take any castellated configuration, with alternating grooves and raised or castellated portions. The castellations should have straight sides, preferably at an angle of 90° or less with the base of the grooves, but in no case less than 30°. The angle of the base gives reentrant sides if less than 90°. The angle should not exceed 135°.

The depth of the castellations is to some extent determined by the strength or tear resistance of the support and end cap materials. The more material filling the castellations, the stronger the bond. Usually, the castellations give an adequate grip if not less than ⅛ in. in depth. A depth exceeding ½ in. is not normally required.

The raised and depressed portions can be of equal or different lengths. The number is not critical, but will usually be from four to thirty-six over the 360° of the support circumference.

The preferred filter element obtained in accordance with the invention thus comprises, in combination, a filter sheet material formed in a tubular configuration having at least one open end; an end cap closing off the open end, and formed of thermoplastic resin; and a support for the filter tube, the support having at least one castellated end, and all three being of the same thermoplastic resin, the open ends of the filter sheet and support being embedded in the end cap to a depth of from about 10% to about 90% of the cap thickness, the thermoplastic cap material permeating the porous sheet material, and substantially filling the castellation grooves thereof thereby forming a continuous leakproof matrix of thermoplastic resin at the interface between the end cap, the support and the filter sheet material, ensuring an internal structure and a leak-tight seal therebetween Preferred embodiments of the invention are shown in the attached drawings, in which:

Figure 1:
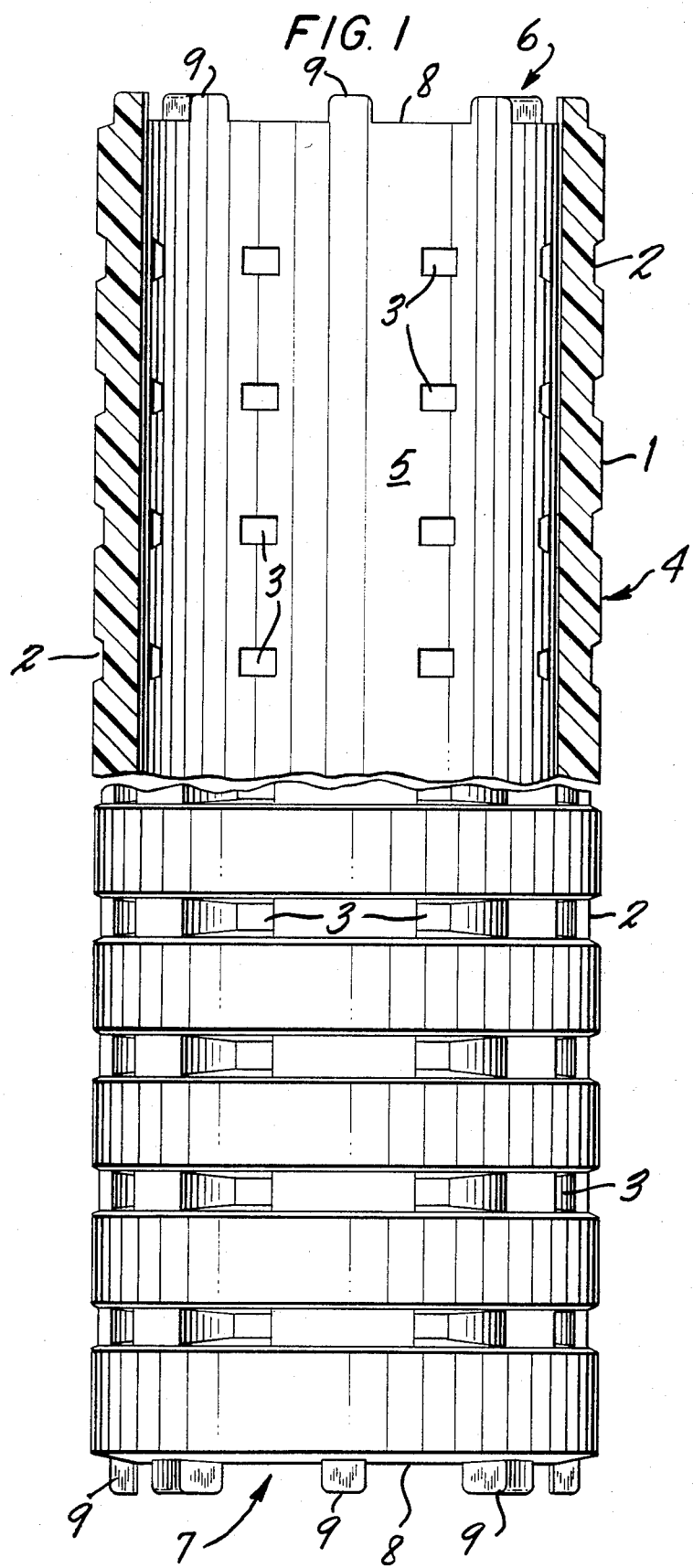
FIG. 1 is a side view of a filter core support in accordance with the invention having castellated ends.
Figure 2:
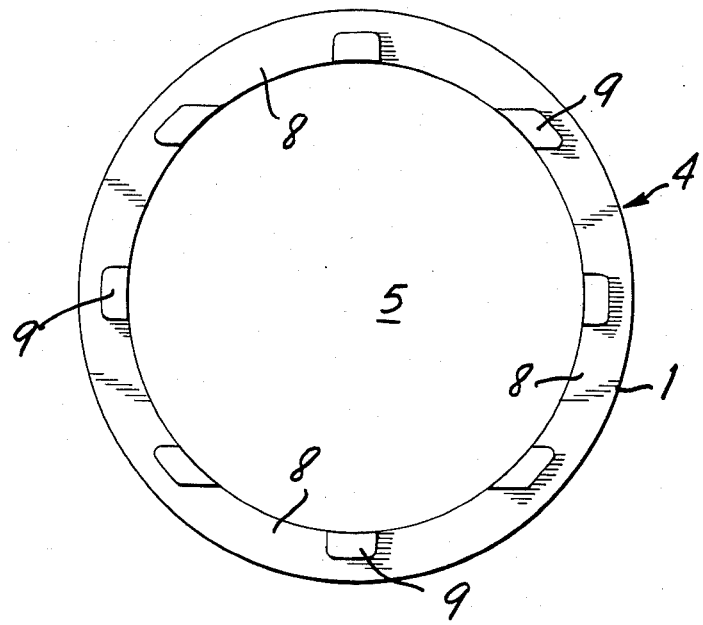
FIG. 2 is an end view of one catellated end of the filter core support shown in FIG. 1.

The filter core support shown in FIGS. 1 and 2 has a tubular body 1, formed with a plurality of circumferential grooves 2, the grooves having a number of apertures 3 through the base thereof, leading from the outside face 4 to the inside central passage 5 of the core.

Each end 6, 7 of the core is castellated, with a series of twelve castellations defining grooves 8 and raised portions 9 uniformly spaced about the end faces of the core.

Figure 3:
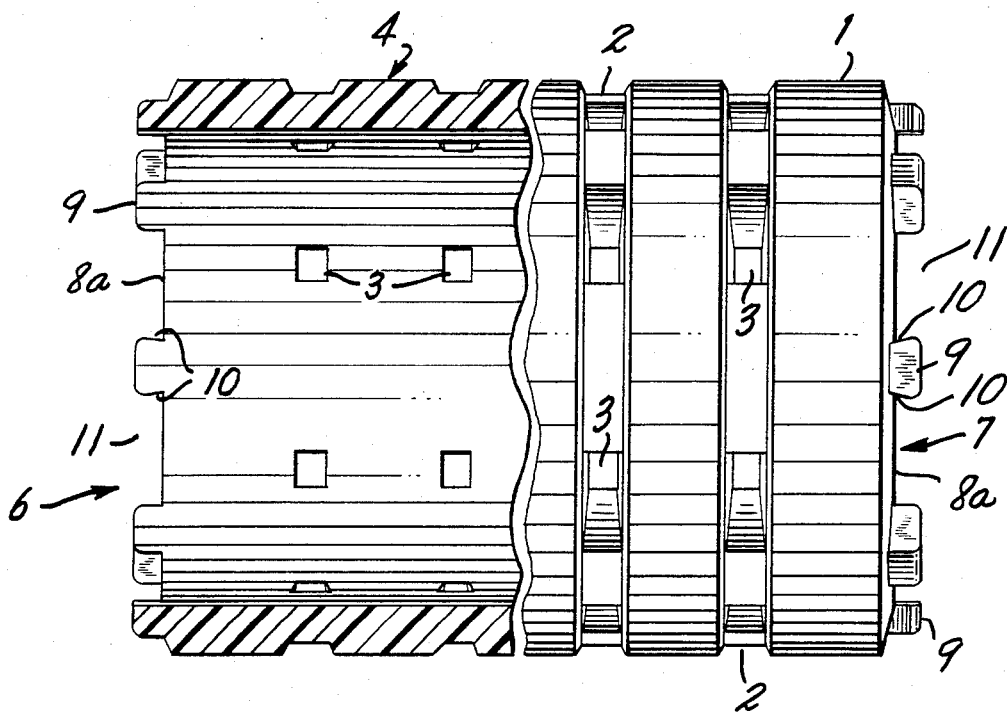
FIG. 3 is a side view of another embodiment of filter core support in accordance with the invention, having castellated ends with reentrant portions in the grooves thereof.
Figure 4:
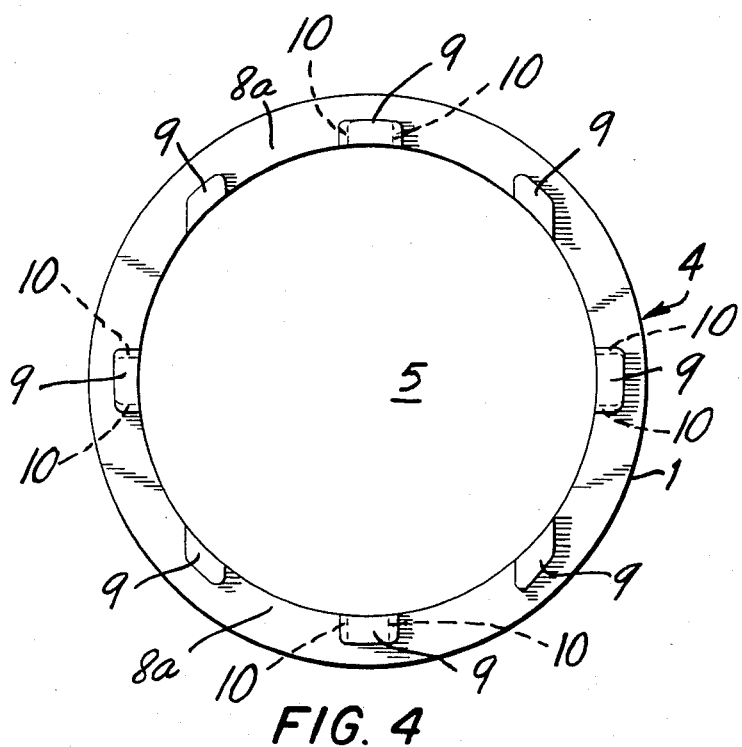
FIG. 4 is an end view of one castellated end of the filter core support of FIG. 3.

The core shown in FIGS. 3 and 4 is similar to that shown in FIGS. 1 and 2, with like reference numerals for like parts, but with the grooves 8a arranged with reentrant portions 10, widening the grooves at their base, as compared with the opening 11 at the tops of the grooves.

Figure 5:
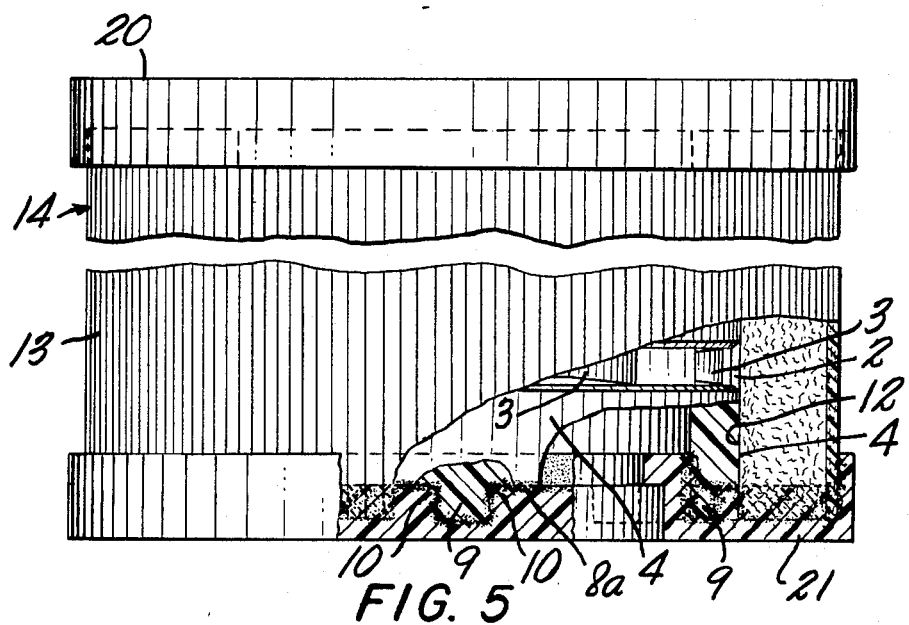
FIG. 5 is a side view with portions cut away of a filter cartridge in accordance with the invention, showing end caps applied to the filter core support of FIGS. 3 and 4, with end cap material substantially filling the castellations at each end and also penetrating the end portions of the filter tube.

With the provision of the circumferential grooves 2 and apertures 3 at the base of the grooves, it becomes possible to support the inner tips 12 of the corrugations 13 of a filter tube 14, as seen in FIG. 5 upon the external periphery 4 of the core without blocking flow at that point. Fluid passing through the filter sheet, although blocked from passage at the points where the filter sheet is in contact with the raised portions 9 of the face 4 of the core, can pass through at the tops of the grooves 2, enter the grooves, and then run along the grooves until it reaches one of the apertures 8, whereupon it can pass through the core 1 to the inside central passage 5 of the core.

The filter core shown in FIGS. 3 and 4 is represented as the internal support of a filter cartridge in FIG. 5, having end caps 20, 21 fixedly attached to the core by end cap material substantially completely filling the reentrant grooves 8a of the castellated end of the core. The end caps are thus integrally keyed and thereby locked to the core, making it impossible to detach them without actual rupture of the end cap material, or the core support material.

The filter cartridge shown in FIG. 5 is prepared using the apparatus shown in FIGS. 1 to 4 of U.S. Pat. No. 3,457,339.

An end cap 20 or 21 is placed in the recess 12 of the end cap holder 30 as shown, and the plate 46 is rotated about shaft 50 until burner 32 is positioned directly above the end cap holder 10. Switch 24 is then thrown to raise the end cap holder to the up position shown in FIG. 2.

In FIG. 2, burner 32 has been rotated about shaft 50 by means of handle 38 attached to plate 46 until it is directly over end cap holder 10. End cap holder 10 has been raised to a position in close proximity to burner head 34 by throwing foot switch 24 as described above.

A direct flame is applied to the end cap to heat the end cap to a temperature above its maximum softening point to liquefy at least a portion of the thickness thereof. The coolant is continually circulated through the end cap holder 10 via hoses 28 and 30, thereby chilling the recess 12 upon which the end cap is positioned, and consequently chilling at least a portion of the thickness of the end cap to a temperature well below its softening point. Next, the switch 24 is opened, thereby lowering the end cap holder, and the plate 46 is rotated about shaft 50 until filter element holder 48 is directly above end cap holder 10. Filter element 49, composed of a filter tube and accompanying internal core, the edges of the filter tube and core support being of substantially the same length, are inserted into filter element holder 48 and manually held in place therein.

In FIG. 3, the end cap holder has been lowered and plate 46 has been rotated about shaft 50 until filter element holder 48 is directly above end cap holder 10. Filter element 49 has been inserted within filter element holder 48 and is manually held in place therein. The end cap holder is then raised by throwing switch 24 so that the edge 52 of the filter element including both the filter tube and the castellated end of the filter core are embedded in the liquefied portion of the end cap, and thereby supported by the end cap holder 10 and plate 46. The liquid thermoplastic material is allowed to permeate the pores of the filter material and the castellations of the filter core to ensure the subsequent formation of a leakproof seal, and fix the core to the end cap in a manner to accept a considerable torque without damage to or rupture of the cartridge.

In FIG. 4, the end cap holder has been raised and the edge 52 of the filter element is embedded in the liquefied portion of end cap 14 so that the thermoplastic material can permeate the pores of the filter material and the castellations of the filter core.

After the liquefied portion of the thermoplastic end cap has hardened, switch 24 is opened, thereby lowering the end cap holder and filter element embedded in the hardened end cap. The capped filter element 49 is removed from the end cap holder 10 and the procedure is repeated for the other end of the filter element.

In FIG. 5 the part of the filter element in cross section shows that the thermoplastic end cap has penetrated the pores of the filter material and the castellations of the filter core and has solidified therein, thereby forming a leak-proof seal of exceptional strength. Furthermore, the end cap and core are made of the same thermoplastic resin and have been melt-bonded at the point of junction and, in essence, are one piece.

In the Figures, the filter element of the invention has been made using the process and apparatus of FIGS. 1 to 4 of U.S. Pat. No. 3,457,339. Instead of melt-bonding a preformed end cap to the filter element, it is however possible to dip the castellated support and the filter element in molten end cap material, and then permit the end cap material to harden, thus embedding the support in the end cap and forming the end cap in situ. In this case, a mold or pot for the molten end cap material is required, that has the external shape and configuration of the required end cap, for the filter element or cartridge. Such a procedure is disclosed in U.S. Pat. No. 2,732,031 dated Jan. 24, 1956 to Rabbit et al; U.S. Pat. Nos. 2,771,556 and 2,934,791 to Kasten et al, dated Nov. 20, 1956, and May 3, 1960 respectively; and U.S. Pat. No. 2,941,620 to Thornberg, dated June 21, 1960. In utilizing this procedure, the filter support of course has at least one castellated end, and the end caps are formed in situ at each such castellated end, in sequence.

Having regard to the foregoing disclosure, the following is claimed as the inventive and patentable embodiments thereof:

1. A filter cartridge comprising, in combination:
   (1) a filter sheet material formed in a tube open at at least one end;
   (2) a support having a substantially closed tubular configuration disposed in supporting relation to and substantially coextensive with the tube and supporting the filter sheet material of the tube;
   (3) the support having one end at the open end of the tube formed in a castellated configuration, the castellations having uniformly spaced raised portions and recessed portions in a number within the range from four to thirty-six over the 360° of support circumference, and in which the recessed portions have reentrant sides at an angle of less than 90° but not less than 30° to the base of the recessed portion; and
   (4) at least one end cap attached to and extending across the open end of the tube of filter sheet material, and having embedded therein at least the castellated end of the support, with end cap material extending into and substantially filling the reentrant recessed portions, thereby fixedly attaching the end cap to the support in a leak-tight seal.

2. A filter cartridge in accordance with claim 1 in which the end portion of the tube of filter sheet material is also embedded in the end cap.

3. A filter cartridge in accordance with claim 1 wherein the edges of the filter sheet and support are ground so that they are substantially flush prior to applying the end cap thereto.

4. A filter cartridge in accordance with claim 1 wherein the support is an internal support core whose edges are subtantially flush with the edges of the filter material.

5. A filter cartridge in accordance with claim 1 wherein the filter sheet material is a thermoplastic resin.

6. A filter cartridge in accordance with claim 1 wherein the filter sheet material is folded in corrugated configuration.

7. A filter cartridge in accordance with claim 1 wherein the filter sheet material has an average pore size of less than about 5 microns.

8. A filter cartridge in accordance with claim 1 wherein the filter sheet material includes an internal support core and the filter material, internal support core and end cap are made of the same thermoplastic material.

9. A filter cartridge in accordance with claim 8 wherein the thermoplastic material is polypropylene.

10. A process for applying an end cap to filter sheet material formed in a tube open at at least one end and supported by a support that is substantially coextensive with the tube, and which comprises:
  (1) forming at least one end of the support in a castellated configuration, the castellations having uniformly spaced raised portions and recessed portions in a number within the range from four to thirty-six over the 360° of support circumference, and in which the recessed portions have reentrant sides at an angle of less than 90° but not less than 30° to the base of the recessed portions;
  (2) embedding the castellations of the support into one face of the end cap with end cap material extending into and substantially filling the; reentrant recessed portions; and
  (3) hardening the end cap material, thereby fixedly attaching the end cap to the support in a leak-tight seal.

11. A process in accordance with claim 10 in which the end cap is preformed, and which comprises heating an inside face of the end cap to a temperature sufficient to fuse from about 10 to about 90% of the thickness of the end cap into a liquid of a viscosity capable of penetrating into the reentrant recessed portions of castellations of the support, while cooling the outside face of the end cap to a temperature below its softening point, to maintain the remainder of the end cap in a solid state, embedding all of the castellated edges of the support into the end cap material so that the material extends into the reentrant recessed portions; and then hardening the end cap material.

12. A process in accordance with claim 10 including the step of grinding the edges of the filter sheet and support so that they are substantially flush prior to applying the end cap thereto.

13. A process in accordance with claim 10 wherein the support is an internal support core whose edges are substantially flush with the edges of the filter material.

14. A process in accordance with claim 10 wherein the filter sheet material is a thermoplastic resin.

15. A process in accordance with claim 10 wherein the filter sheet material is folded in corrugated configuration.

16. A process in accordance with claim 10 wherein the filter sheet material has an average pore size of less than about 5 microns.

17. A process in accordance with claim 10 wherein the filter sheet material includes an internal support core and the filter material, internal support core and end cap are made of the same thermoplastic material.

18. A process in accordance with claim 17 wherein the thermoplastic material is polypropylene.

19. A process in accordance with claim 10 in which the end cap is formed in situ, and which comprises heating end cap material to a temperature sufficient to fuse the material into a liquid of a viscosity capable of penetrating into the reentrant recessed portions of castellations of the support, embedding all of the castellated edges of the support into the end cap material so that the material extends into the reentrant recessed portions; and then hardening the end cap material.

20. A process in accordance with claim 19 wherein the support is an internal support core whose edges are substantially flush with the edges of the filter material.

21. A process in accordance with claim 19 wherein the filter sheet material is a thermoplastic resin.

22. A process in accordance with claim 19 wherein the filter sheet material is folded in corrugated configuration.

23. A process in accordance with claim 19 wherein the filter sheet material has an average pore size of less than about 5 microns.

24. A process in accordance with claim 19 wherein the filter sheet material includes an internal support core and the filter material, internal support core and end cap are made of the same thermoplastic material.

25. A process in accordance with claim 24 wherein the thermoplastic material is polypropylene.

* * * * *